March 2, 1948. H. F. WATERS 2,437,057
HEAT SEALING METHOD
Filed May 11, 1942 2 Sheets-Sheet 1

INVENTOR
Harry F. Waters
BY
Frederick A. Norton

March 2, 1948. H. F. WATERS 2,437,057
HEAT SEALING METHOD
Filed May 11, 1942 2 Sheets-Sheet 2
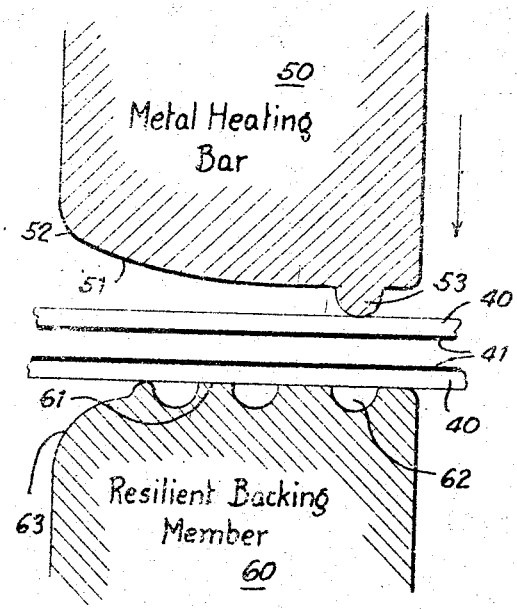
Fig. 4.
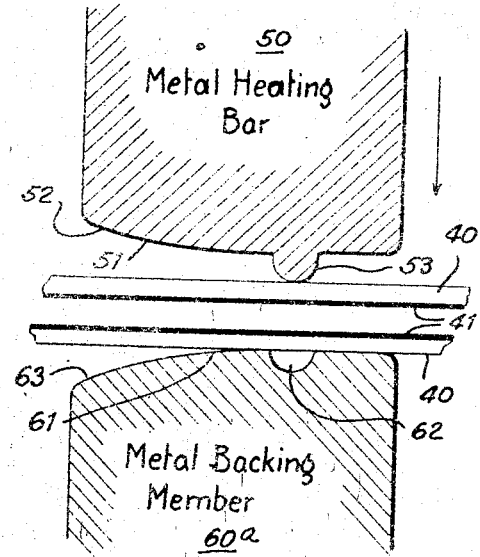
Fig. 6.
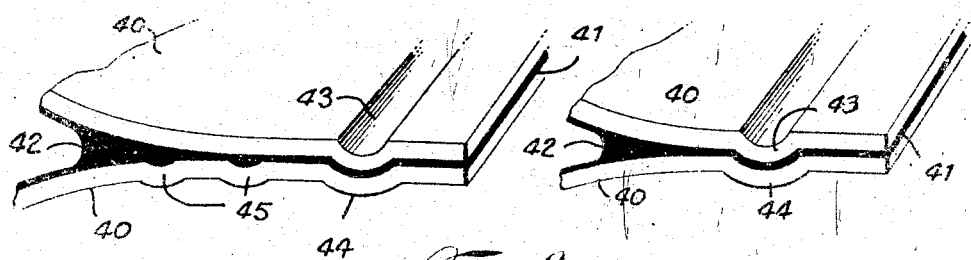
Fig. 5.
Fig. 7.
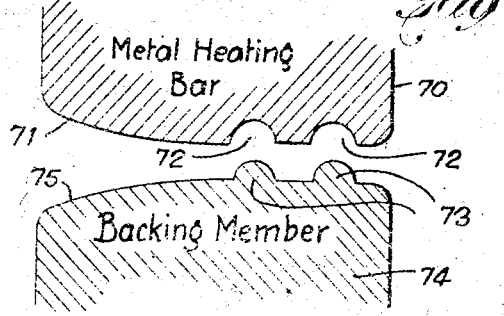
Fig. 8.
INVENTOR
Harry F. Waters
BY
Frederick A. Norton Patented Mar. 2, 1948

2,437,057

UNITED STATES PATENT OFFICE 2,437,057

HEAT SEALING METHOD

Harry F. Waters, New York, N. Y.

Application May 11, 1942, Serial No. 442,528

1 Claim. (Cl. 154—42)

This invention relates to improvements in methods of heat sealing, and, more particularly to a novel method of forming reinforced heat seals in thermoplastic bag members.

Hitherto, thermoplastic sheets have been seamed or joined by heat sealing between metallic bars, one of which usually contained a heating element. Under the conditions of heat and pressure obtaining in such installations, the thermoplastic material immediately under the influence of heat and pressure, would be squeezed out of place, leaving a substantially weak seam. In exaggerated cases, where too much heat or too much pressure, or both, would be applied, the seam area would be substantially void of any interfused plastic materials, due to the liquefaction and squeezing out of same from the seam area.

It has now been found that reinforced, liquid-tight thermoplastic heat-sealed joints, or seams, can be obtained by correlating the applied pressure and time of sealing with particular reference to a specially conformed sealing assembly comprising a metal heating bar and a resilient backing member or anvil, so conformed and arranged, as to insure a substantially V-shaped dam or seam of the fused thermoplastic material at the heat seal or joint. The provision of such a seal with excess material from the heat seal area, is a feature of profound importance and, results in heat-sealed members, including envelope bags and the like, of great structural strength and high resistance to liquid and gas penetration.

The features of novelty and advantages of the present invention will therefore be seen to include absolute uniformity of seam structure, together with reinforced dam or seam at the inside of the bag or package, and by simple modification of heat sealing members of the type originally shown and described in my prior patents and applications, as follows: Patent Nos. 2,239,133, of July 2, 1937; 2,262,480, of November 11, 1941; 2,125,758, of August 2, 1938; 2,220,873, of November 5, 1940; 2,252,105, of August 12, 1941.

The above indicated features of novelty and advantage will be described in the specification and illustrated in the drawings, certain preferred embodiments, being shown by way of example, only, for, since the underlying principles may be incorporated in other specific structures and devices, it is not intended to be limited to the ones here shown, except as such limitations are clearly imposed by the appended claim.

In the drawings, like numerals refer to similar parts throughout the several views, of which Fig. 1 is an elevation of a bag and box combination, both being shown in open condition and the bag with heat-sealed seams;

Fig. 4 is a vertical section of a heating bar and resilient backing member with multiple grooves and V-forming surfaces with sheets of thermoplastic shown therebetween;

Fig. 5 is an end view of a heat-sealed pair of thermoplastic faced sheets showing the formation of the V-seal or dam at the interior of the seam;

Fig. 6 is a view similar to Fig. 4, showing modified coacting hammer and anvil elements;

Fig. 7 is a view similar to Fig. 5, showing the heat-seal and V-dam formed by the structure of Fig. 6, and Fig. 8 is a vertical section of yet another modified sealing combination.

Figure 1:
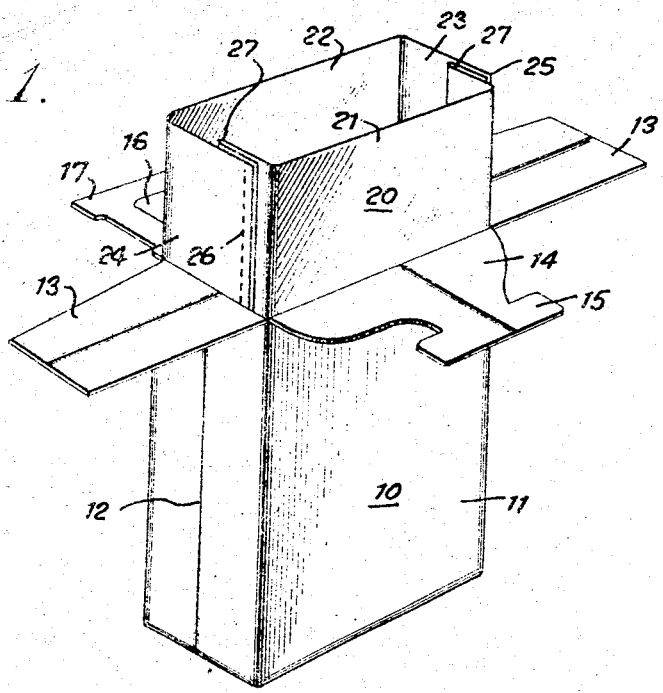
Figure 2:
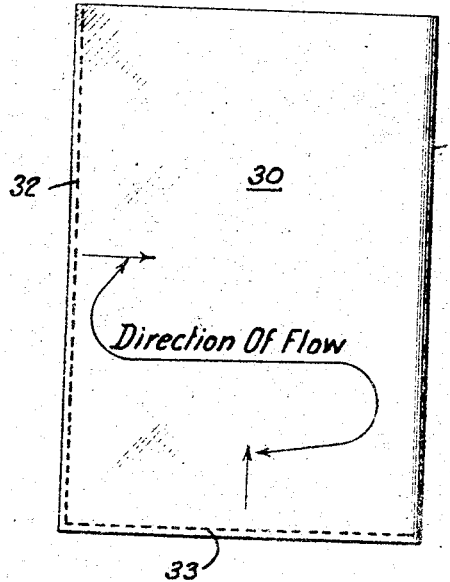
Fig. 2 is a plan view of a heat-sealed bag envelope having an L-seam.
Figure 3:
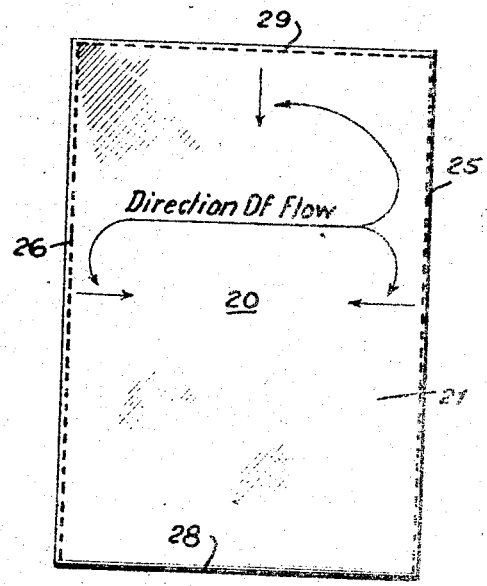
Fig. 3 is a view similar to Fig. 2 showing a bag envelope with parallel marginal seams.

As indicated hereinabove, the heat-sealing apparatus of the present invention finds particular utility and application in the formation of bag envelopes for packaging purposes. Referring more particularly to the drawings, such bag envelopes and their utility are shown in Figs. 1 to 3. In Fig. 1 a carton or box 10, is shown having front and back walls 11, end walls 12, and top and bottom closures, including fold over tabs 13, and locking tabs 14, with ears 15, adapted to be fitted under and locked by tabs 16 of cooperating closure tab 17. In this package or box is fitted a squared-up bag envelope 20, having front and back walls 21, 22 and end walls 23, 24 with heat-seals or seams 25, 26. It will be noted that the seals are spaced from the longitudinal fold lines designated generally by the numeral 27.

In the preparation of the bags as shown in Fig. 3, the envelope 20 is comprised of a blank of material having a thermoplastic surfacing folded along a fold line 28 to bring the marginal edges in juxtaposition. By applying heat and pressure in machines of the type indicated in Figs. 4, 6 and 8, the marginal heat seams 25, 26 are formed. By forming such seals of V-cross section at the inside of the seam, the direction of flow of the extra thermoplastic material interfused by the action of heat will be inwardly of the bag seams, all as indicated by the arrows and legend in Fig. 3. When the top seam 29 is formed, after the bag and package has been filled, the self-same desirable seam condition will be obtained. In Fig. 2, another bag 30 is shown folded over on a longitudinal edge or center 31, and sealed in a continuous L-seal along the side edge 32 and bottom 33. Bags made in the manner indicated in Fig. 2 are of particular utility in vacuum packages, as the edge fold 31 permits the introduction of a vacuum spout without collapse of the bag before the desired vacuum can be established, as is often the case in bag structures having no substantial lateral wall strength of any kind.

Referring now to Fig. 4, the method of joining a pair of sheets, 40, of paper or other suitable material having inner faces or linings 41 of thermoplastic material, will be described. A metal heating bar 50, having a heating element, not shown, is provided with a working face 51 of gentle curvature flaring outwardly in a bell shape, as indicated at 52, to form the half, or one leg of a curved V. This member is also provided with a ridge 53 located at the rear side or back thereof. The bottom member or anvil, 60, is usually made of rubber, and comprises a grooved top surface 61, having a plurality of grooves 62, at least one of which is adapted to register with ridge 53 of the heating bar. The forward edge of member 60 terminates in a generally bell shape section or edge 63, reversely symmetrical with section 52 of the heating bar. With the heating bar maintained at the proper temperature for the particular material to be heat-fused, suitable pressure is applied and the heating bar caused to move into engagement with the resilient backing member 60. The two sheets 40 are thus forced together with the thermoplastic faces 41 interfused and a positive V or dam 42 formed at the inner surface of the seam. The mating ridges and grooves 53, 62 will form a corresponding groove 43 and ridge 44 in the joined sheets in the seam area, and the extra grooves will cause the formation of depressions 45, each of which receives thermoplastic material, and all of which grooves serve to apply a mechanical interlock for the fused thermoplastic of the seam. This seam structure is duplicated substantially in Fig. 7, with the exception of the extra depressions 45 in the lower sheet. This seam of Fig. 7 is formed between the pressure members shown in Fig. 6, the lower member or anvil 60a being generally similar to the member shown in Fig. 4, but being made of metal instead of rubber, and also characterized by the use of a single groove or depression in the face or working surface thereof.

In the structure shown in Fig. 8, the metal heating bar 70 is provided with a curvilinear face 71, having the usual half-V configuration, and a plurality of grooves 72 cooperating with a pair of ridges 73 formed on backing member or anvil 74, of resilient material, or metal, as may be desired. This anvil member has its operating face 75 symmetrical with face 71 to permit the formation of the V-dam of fused thermoplastic therebetween.

It will now be appreciated that a novel method of forming heat seals to provide reinforced seams of V-shape, has been provided, and the utility of such seams in bags, envelopes, and closures for packages has been shown and discussed. In addition, novel structural sealing members adapted for this particular purpose have been disclosed, and the method of operating same clearly set forth. The V-shaped seams of the packages formed according to the present invention are new and structurally distinctive, as well as functionally more efficient than plain flat seals hitherto known.

Having now particularly described and ascertained the nature of my said invention, and in what manner the same is to be performed, I declare that what I claim is:

The method of forming heat seals comprising juxtaposing heat-sealable faces of sheet material, and applying heat and pressure to interfuse the same in a continuous seam with a flaring, generally V-shaped excess of the interfused sheet material formed as a dam interiorly and longitudinally of the seam.

HARRY F. WATERS.

REFERENCES CITED

The following references are of record in the file of this patent:

UNITED STATES PATENTS

| Number | Name | Date |
|---|---|---|
| 761,890 | Kepler | June 7, 1904 |
| 1,940,559 | Moore | Dec. 19, 1932 |
| 1,940,561 | Moore | Dec. 19, 1932 |
| 1,948,570 | Ferenci | Feb. 27, 1934 |
| 2,051,903 | Royal | Aug. 25, 1936 |
| 2,114,625 | Bergstein | Apr. 19, 1938 |
| 2,184,166 | Rape | Dec. 19, 1939 |
| 2,220,873 | Waters | Nov. 5, 1940 |
| 2,227,497 | Hallman | Jan. 7, 1941 |
| 2,253,946 | Waters | Aug. 26, 1941 |
| 2,259,822 | Rienlen | Oct. 21, 1941 |
| 2,278,502 | Waters | Apr. 7, 1942 |
| 2,343,117 | Vincent | Feb. 29, 1944 |